April 26, 1949.   J. C. SHAW   2,468,519
COMBINATION OIL COOLER AND VALVE MECHANISM
Filed Dec. 4, 1946   2 Sheets-Sheet 1

Inventor:
Joe C. Shaw,
By Soans Pond Henderson
Attorneys.

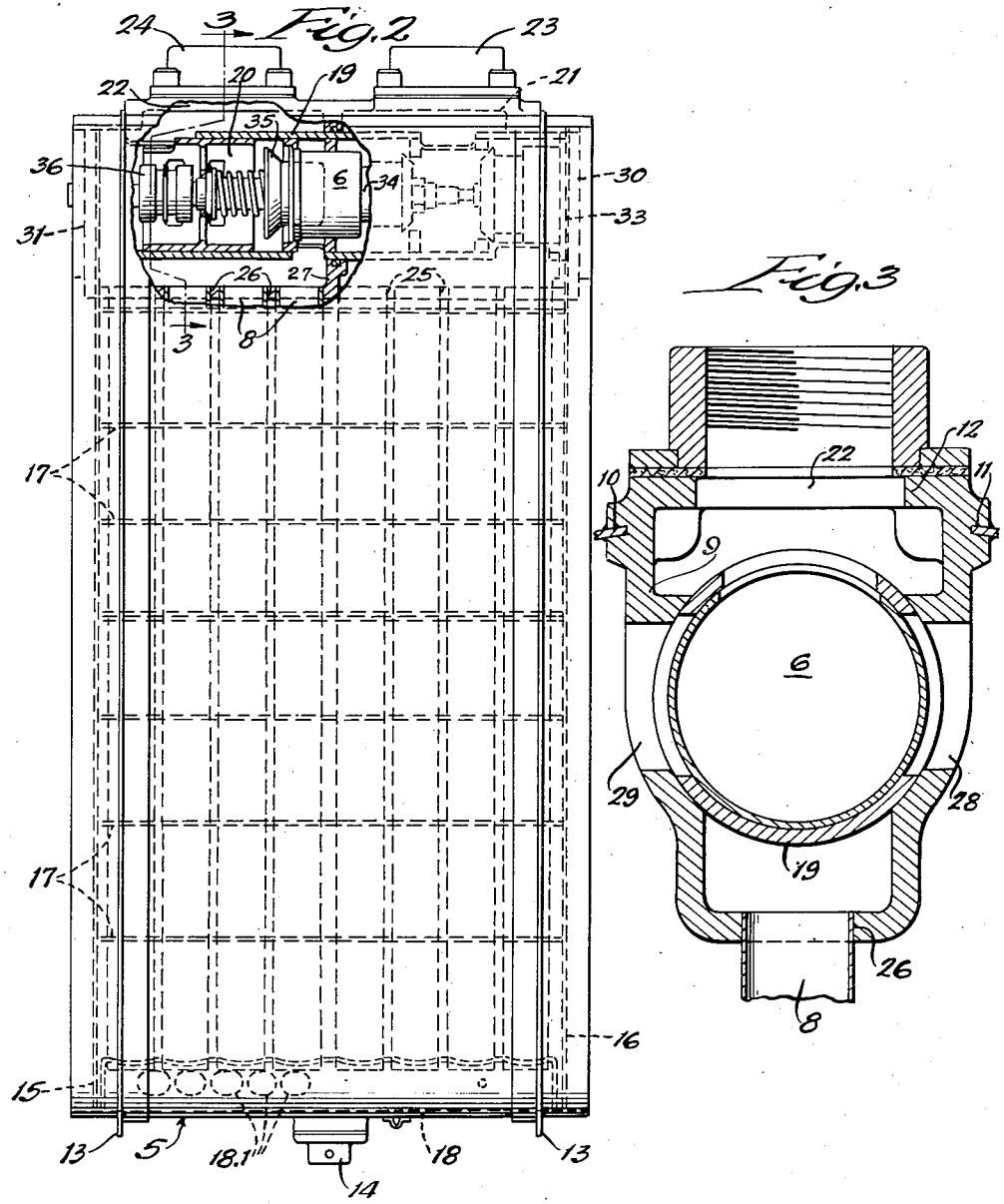

Patented Apr. 26, 1949

2,468,519

UNITED STATES PATENT OFFICE 2,468,519

COMBINATION OIL COOLER AND VALVE MECHANISM

Joe C. Shaw, Racine, Wis., assignor to Young Radiator Company, Racine, Wis., a corporation of Wisconsin Application December 4, 1946, Serial No. 713,964

2 Claims. (Cl. 257—2)

1

Some type of heat-exchange device for conditioning lubricating oil is an imperative accessory for aircraft power units. In the pioneer aircraft this heat-exchange device, or oil cooler as it came to be called, was rather simple, as was also the valve means for controlling its functioning. Flying was comparatively more simple than at present. Then no consideration was given to using aircraft in cold weather or climates. Neither was aircraft flown at very high altitudes with its concomitant low temperatures. Accordingly, a spring-loaded valve served to control the functioning of oil coolers for these pioneer craft.

Greater daring motivated attempts to risk flights in cold weather and climates, and to expore the higher altitudes. These attempts made it evident that a superior and more flexible oil cooling equipment was required. As a result thermostatically-actuated valve mechanisms replaced the spring-loaded valve; surge protection valves were inserted in the oil line to protect the oil cooler from excessive pressures.

The subjection of aircraft to increasing demands of commerce and extreme emergencies of war necessitated an enlargement and multiplication of the power units. Such enlargement and multiplication of power units necessarily magnified the demands for even more superior oil cooling equipment. These magnified demands confronted the oil cooler manufacturers with problems solutions of which tested the skill and ingenuity of their engineers.

Concurrently the aircraft manufacturer was confronted with the problem of making provision for enlarged oil cooler equipment with a minimum use of aircraft space and the least addition of weight. Maximum efficiency of oil cooler equipment was sought within limited weight and space requirements. The interchangeability of valve mechanisms and cooling units made by different manufacturers was earnestly desired if not demanded. Reduction in costs of material and labor were expected to accompany refinements incident to meeting the demands of standardization.

The main objects of this invention, therefore, are to provide an improved valve-controlled oil cooling device for the lubricating oil used for aircraft power units; to provide an improved device of this kind wherein the controlling valve mechanism is incorporated within the oil cooling unit itself; to provde an improved valve housing adapted for incorporation with oil cooling units of the type which provides a by-pass chamber arranged in heat-exchange relationship with the main cooling core; to provide an improved arrangement of

2 the valve mechanism housing for cooling units of this kind which permits the placement of the valve mechanism within the valve housing after the cooling unit and valve housing have been completely assembled; and to provide an improved light-weight and compact valve-control oil cooling device of this kind which is economical to manufacture and highly efficient in use.

A preferred form of valve-controlled fluid-cooling device embodying this invention is shown in the accompanying drawings in which:

Fig. 2 is a side elevation of the same, a portion of the casing being broken away so as to reveal in cross section a part of the valve control mechanism; and Fig. 3 is an enlarged cross sectional detail taken on the line 3—3 of Fig. 2 showing the manner in which the valve housing is suspended within the cooler casing.

Figure 1:
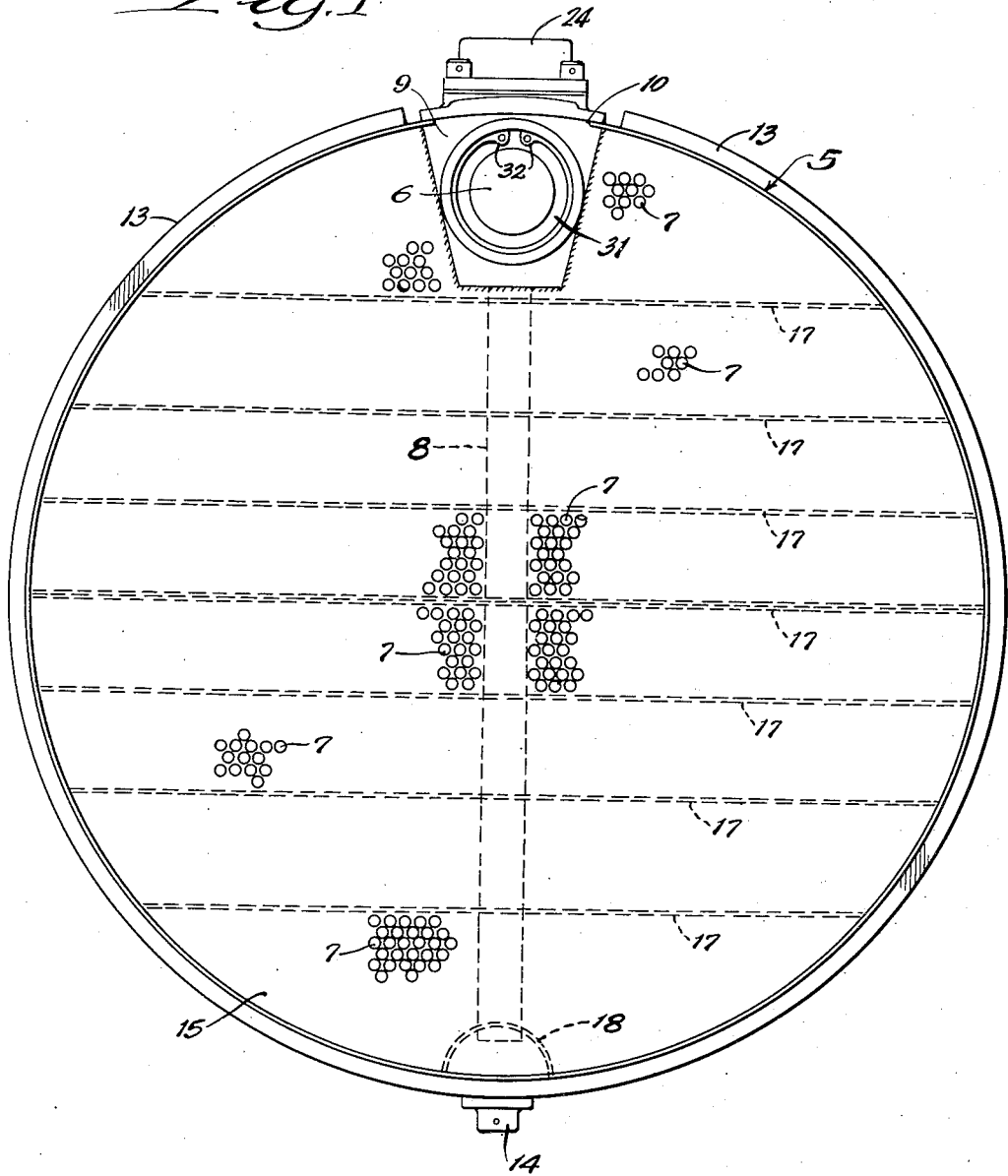
Fig. 1 is a front end view of the device.

The preferred form of valve-controlled fluid-cooling device constructed in accordance with this invention comprises, an oil-core casing 5 within which is suspended valve mechanism 6 thermostatically actuated so as to control the passage of oil either through the core formed around the battery of tubes 7 or through a warm-up chamber formed by the transversely-disposed tubes 8, when the oil is not caused to by-pass both the core around the tubes 7 and the warm-up chamber through the tubes 8.

The casing 5 is formed of a thin sheet-metal strip of a width substantially equal to the length of the housing 9 of the valve mechanism 6. It is bent to form a cylinder with the lateral edges 10 and 11 thereof bonded to the valve housing 9 so as to suspend the valve housing within the casing, leaving only the top wall 12 exteriorly of the casing 5. The bonding is preferably accomplished by seating the edges of the casing in slots and then brazing the parts in the usual manner.

A pair of flanged rings 13 are welded to the exterior of the casing 5 to afford reinforcement therefor. The usual drain outlet, closed by a plug 14, is formed in the casing 5 opposite the valve mechanism 6.

The tubes 7 extend axially of the casing 5 and in this particular embodiment are supported at their ends by headers 15 and 16 which are brazed or welded within the opposite ends of the casing 5. These tubes fill the space within the casing on opposite sides of the warm-up chamber tubes 8 and around valve housing 9. The space around the tubes constitutes a core through which the oil flows in heat-exchange contact with a coolant, either in the form of air or other fluid, passing through the tubes 7. The usual spaced baffles 17 are interposed between groups of tubes 7. Adjacent baffles have openings formed at respectively opposite ends thereof so that the oil flowing through the core around the tubes 7 is caused to follow a circuitous path back and forth axially of the casing 5.

The warm-up chamber tubes 8 are arranged diametrically across the interior of the casing 5 in a plane disposed axially of said casing. They extend between the valve housing 9 and a header 18, bonded to the interior of the casing 5 at a point directly opposite the valve housing 9. These tubes provide communication between the valve housing 9 and the header 18, as will appear more fully hereinafter. The header 18 has a number of holes 18.1 formed therein which afford communication between the header and the core surrounding the tubes 7.

The valve mechanism 6 comprises the housing 9 wherein is supported a sleeve 19 (see Figs. 2 and 3) and which mounts the thermostatically-actuated valve means 20 of a form and function shown in copending application Serial No. 713,966, filed December 4, 1946, and whereby the flow of oil through the core around the tubes 7 or through the warm-up chamber tubes 8 is controlled.

The valve housing 9 is generally in the form of a casting, cross-sectionally shaped somewhat like a keystone, and of a length aproximately equal to the width of the casing 5. Various ports are formed in the walls of the housing to provide communication between the lubricating oil line and the core around the tubes 7 or the passage through the warm-up chamber tubes 8, under the control of the thermostatically-actuated valve means 20.

A main inlet port 21 and a main outlet port 22 are formed in the top or exterior wall 12 of the housing 9, to which wall preferably are secured fittings 23 and 24 for attachment to the pipes of the lubricating oil line. In the wall directly opposite the exterior wall 12 are formed a series of apertures which constitute an auxiliary outlet port 25 and an auxiliary inlet port 26 communicating with the tubes 8, the ends of which fit within said apertures. A partition 27 (see Fig. 2) separates the auxiliary outlet port 25 and inlet port 26 from each other and also provides support for the sleeve 19.

The lateral or side walls of the valve housing 9 are provided with auxiliary inlet ports 28 and 29 which afford communication between the upper section of the core around the tubes 7 and the interior of the valve housing 9.

End caps or plates 30 and 31 are removably seated in the opposite ends of the housing 9 by means of a well-known type of spring ring 32. This permits a ready insertion of the sleeve-supported valve means 20.

The construction and arrangement of the sleeve 19 and the thermostatically-actuated valve means 20 is fully set forth in the aforesaid copending application. However, other valve mechanisms not involving these details could be arranged in the casing 5 in the manner set forth.

The construction and arrangement of this preferred type of valve means 20 is such that the valve means may be assembled within the sleeve 19 which may then be inserted into the valve housing 9 after the housing has been secured in the casing 5 and all of the tubes 7 and 8, and the baffles 17 properly secured therein. The sleeve 19 is provided with suitable openings which permit communication directly through the sleeve between the main inlet and outlet ports 23, 24 and/or indirectly through the warm-up chamber tubes 8 and/or the core surrounding the tubes 7. These various alternatives of communication are controlled by the shifting of the valve members 33, 34, and 35 under the influence of the thermostatic element 36, as will appear more fully in the aforesaid copending application.

I claim:

1. A valve-controlled fluid-conditioning device comprising, a valve housing having main inlet and outlet ports formed in one wall thereof and auxiliary inlet and outlet ports formed in the opposite wall and other auxiliary inlet ports formed in the lateral walls, a sheet-metal strip of a width substantially equal to the length of said valve housing shaped to form a cylindrical casing and having the lateral edges thereof bonded to said valve housing adjacent to and in approximate circumferential alinement with the housing wall wherein is formed said main inlet and outlet ports whereby said valve housing is suspended within said sheet-metal casing with only said one housing wall exposed, a battery of closely-spaced fluid flow tubes disposed axially of and filling the space within said casing and around said valve housing, said tubes forming a fluid core therearound in heat-exchange relationship with the passages through said tubes and communicating with the auxiliary inlet ports in the lateral sides of said valve housing, means providing a bypass chamber in heat-exchange relationship with said core and communicating at one end with an auxiliary outlet in said valve housing and at its other end with an auxiliary inlet in said valve housing, said bypass means also having a port communicating with said core, valve mechanism arranged within said housing for controlling communication between said main and auxiliary ports, and means sensitive to the condition of the fluid flow through said valve housing for actuating said valve mechanism.

2. A valve-controlled fluid-conditioning device comprising, a valve housing having main inlet and outlet ports formed in one wall thereof and auxiliary inlet and outlet ports formed in the opposite wall and other auxiliary inlet ports formed in the lateral walls, a sheet-metal strip of a width substantially equal to the length of said valve housing shaped to form a cylindrical casing and having the lateral edges thereof set in recesses along said housing lateral walls and bonded to said valve housing so that all of said valve parts other than said main ports are suspended within said sheet-metal casing, a header secured to said casing opposite said valve housing, a plurality of tubes extending transversely across said casing in a plane disposed axially of said casing between said valve housing and header and connecting said first-mentioned auxiliary inlet and outlet ports with said header, a battery of closely-spaced fluid-flow tubes axially disposed of said casing and filling the space within said casing around said first-mentioned tubes and around said valve housing, said latter tubes forming a fluid core therearound in heat-exchange relationship with the passages through said tubes and communicating with the auxiliary inlet ports in the lateral walls of said valve housing, valve mechanism arranged within said housing for controlling communication between said main and auxiliary ports, and means sensitive to the condition of the fluid-flow through said valve housing for actuating said valve mechanism.

JOE C. SHAW.

REFERENCES CITED

The following references are of record in the file of this patent:

UNITED STATES PATENTS

| Number | Name | Date |
|---|---|---|
| 1,578,805 | Cooper | Mar. 30, 1926 |
| 2,288,599 | Ramsaur | July 7, 1942 |
| 2,374,639 | Miller | Apr. 24, 1945 |
| 2,379,109 | Shaw | June 26, 1945 |
| 2,396,053 | McEntire | Mar. 5, 1946 |
| 2,406,203 | Cruzan | Aug. 20, 1946 |

FOREIGN PATENTS

| Number | Country | Date |
|---|---|---|
| 460,047 | Great Britain | Jan. 20, 1937 |